March 17, 1964    R. W. SEABURY, JR    3,125,719
GAUSSMETER PROBES AND HOUSING STRUCTURE FOR SUPPORTING THE
PROBES IN DIFFERENT OPERATIVE ARRANGEMENTS
Filed Oct. 10, 1961
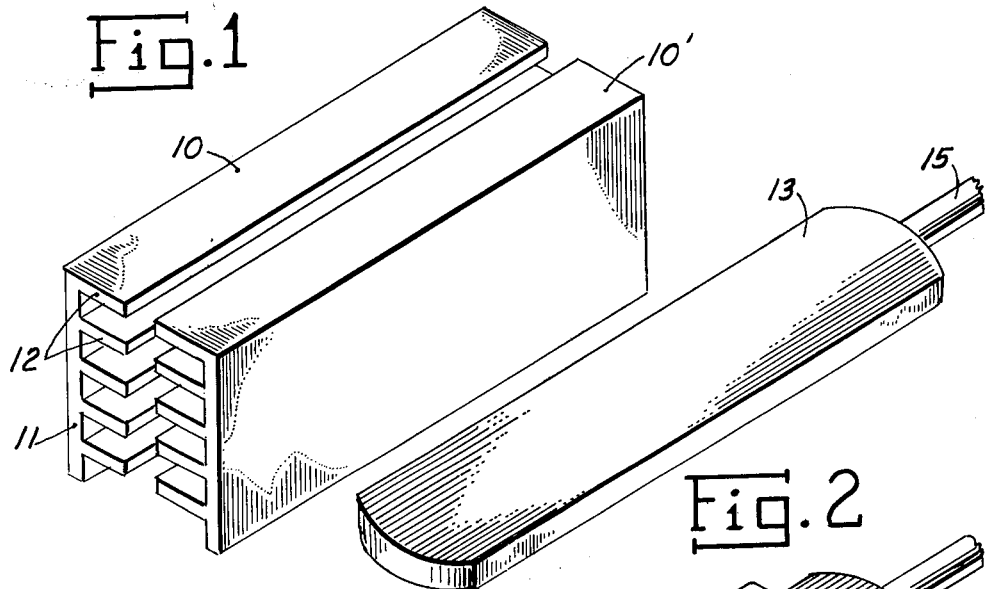
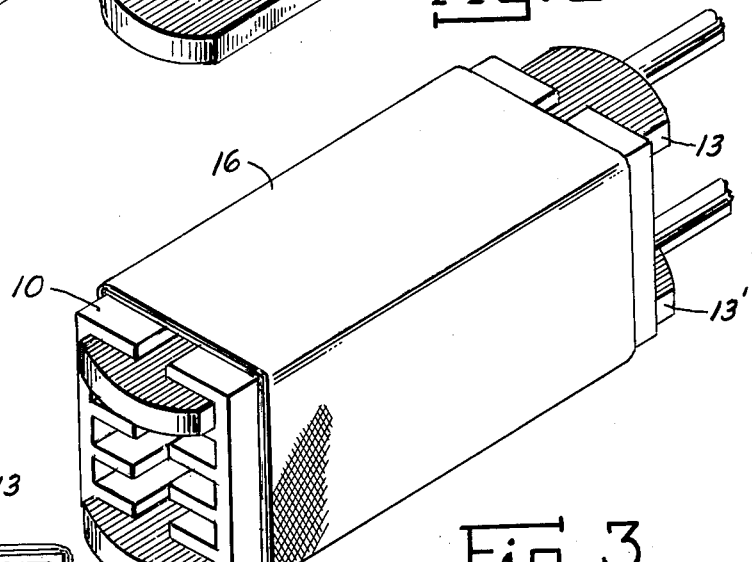
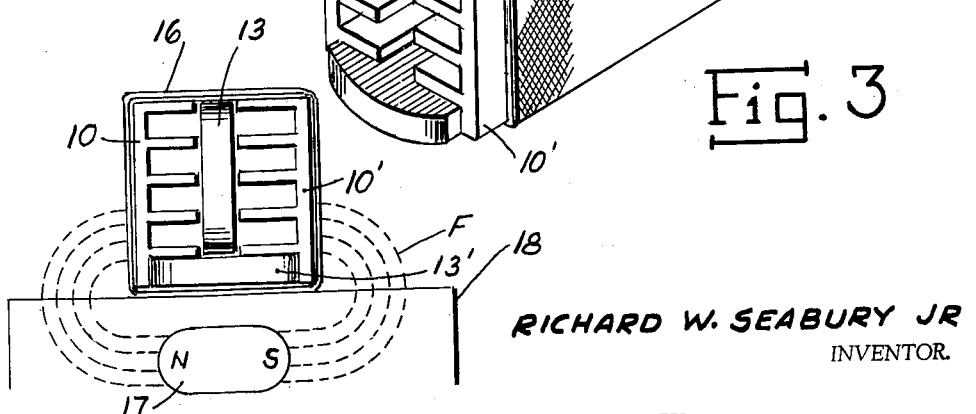
RICHARD W. SEABURY JR
INVENTOR.
BY Rudolph J. Hurick
attorney

United States Patent Office 3,125,719
Patented Mar. 17, 1964

3,125,719
GAUSSMETER PROBES AND HOUSING STRUCTURE FOR SUPPORTING THE PROBES IN DIFFERENT OPERATIVE ARRANGEMENTS
Richard W. Seabury, Jr., Towaco, N.J., assignor to Radio Frequency Laboratories, Inc., Boonton, N.J., a corporation of New Jersey
Filed Oct. 10, 1961, Ser. No. 144,239
2 Claims. (Cl. 324—34)

This invention relates to a device for retaining a pair of sensing elements in operative position and more particularly to a housing for supporting a pair of gaussmeter probes in a selected one of several predetermined, relative positions for measurement purposes.

Gaussmeters, used for the measurement of magnetic field intensity, utilize a sensing probe made of a material exhibiting the Hall effect such as, for example, indium arsenide. Such probes desirably are made as small as possible in order to permit the use thereof in small air gaps.

A differential gaussmeter utilizes two sensing probes affording a measurement of magnetic field gradients and the location of an anomaly in a magnetic material. For these purposes, it is essential that the probe heads be disposed in a fixed, predetermined position during the time when a measurement is being made. Specifically, a parallel disposition of the probe heads at a predetermined spacing is necessary when measuring the gradient of a magnetic field. Inasmuch as the electrical output of the individual probes is a function of the strength of the magnetic field passing through the probe, the difference between the probe outputs varies directly with the magnetic field gradient and with the spacing between the probes.

Consequently, it is desirable to provide means whereby the probe spacing can be increased or decreased by a predetermined distance, thereby adapting the gaussmeter for the measurement of magnetic fields having, respectively, relatively small or large gradients. On the other hand, to adapt the gaussmeter for the location of anomalies the two probes preferably should be disposed in mutually perpendicular planes.

An object of this invention is the provision of a housing for retaining a pair of gaussmeter probes in a selected one of several predetermined, relative positions.

An object of this invention is the provision of a housing for a pair of gaussmeter probes which housing includes means for selectively positioning the probes in parallel planes spaced predetermined distances apart or in mutually perpendicular planes.

An object of this invention is the provision of a housing for supporting a pair of gaussmeter probes in predetermined, fixed, operative position, which housing is of simple, economical construction and which does not materially increase the space required for the normal use of the particular probes.

These and other objects and advantages of the invention will become apparent from the following description when taken with the accompanying drawing. It will be understood, however, that the drawing is for purposes of illustration and is not to be construed as defining the scope or limits of the invention, reference being had for the latter puropse to the claims appended hereto.

In the drawings wherein like reference characters denote like parts in the several views:

FIGURE 1 is an isometric view showing the two matching sections of a housing made in accordance with this invention;

FIGURE 2 is an isometric view of one of the gaussmeter probes;

FIGURE 3 is an isometric view showing the complete housing carrying two probes disposed in parallel planes and spaced the maximum distance apart; and FIGURE 4 is an end view of the complete housing and wherein the probes are positioned in mutually perpendicular planes.

Reference is now made to FIGURE 1, wherein there is shown two identical housing sections 10, 10' molded of or machined from, a suitable dielectric material such as, for example, nylon or Teflon. It is here pointed out that the drawing is made to an enlarged scale. In actual practice, the base 11, of each housing section, is approximately .015" thick and the individual fins 12 are approximately .020" long and .012" thick. The spacing between adjacent fins is about .038" corresponding to the thickness of a probe 13, shown in FIGURE 2.

The probe head is flat, of substantially rectangular shape, and carries the Hall element. Extending from the probe head is a flat, flexible portion identified by the numeral 15, which carries the necessary four lead wires. As is well known in this art, the probe head and lead portion adjacent thereto are encapsulated within a suitable material for purposes of strength and electrical insulation.

FIGURE 3 illustrates the assembled housing carrying two probes 13, 13' with the probes disposed in parallel planes and spaced a maximum distance apart. The assembly is made unitary, in a practical sense, by means of a thin, adhesive tape identified by the numeral 16, which tape is wrapped tightly around the housing sections, as shown. Alternatively, an elastic band or a suitable spring clip could be used for this purpose. The tape has the advantage that it does not significantly increase the cross sectional area of the housing.

It will be apparent that the two probe heads are inserted between desired, aligned fins of the two housing sections after which the tape is applied to retain the probe heads in such position during use of the device for measurement purposes. With the probe heads secured in spaced, parallel planes, the difference in the electrical outputs of the two probes varies directly with the gradient of the magnetic field to which the assembly is subjected. With the probes spaced a maximum distance apart, as shown in FIGURE 3, a maximum output difference is obtained for a given field gradient. In the event the magnetic field gradient is large, so that the difference in the output signals of the two probes exceeds the measuring range of the instrument, the probe spacing can be reduced, quickly and conveniently, by the user.

When it is desired to use the gaussmeter for the location of an anomaly in a magnetic material, the two probe heads should be disposed in perpendicular planes. This can be done, by the user, by positioning the probes within the housing, as shown in FIGURE 4. The anomaly 17 produces a magnetic field F which passes through both probes and the relative outputs of the probes establishes not only the existence of the anomaly but also provides a measure of the distance of the anomaly from the surface of the material 18. It will be noted that the described housing construction is such that the lower surface of the probe 13' is spaced from the surface of the material by the thickness of the tape 16, thereby minimizing the loss of sensitivity of the gaussmeter. The cross-sectional area of the assembly shown in FIGURES 3 and 4 is such that it can be inserted into a hole of ⅜" diameter.

From the above description, the versatility of the housing is apparent. The user is afforded the maximum use of the gaussmeter. Either probe may be used apart from the housing for measurement of magnetic field intensity; or the probes can be positioned in the housing in parallel planes for the measurement of field gradient; or the probes can be positioned at right angles to each other for ascertaining the depth of an anomaly in a magnetic material.

Having now described the invention, what I desire to protect by Letters Patent of the United States is set forth in the following claims.

I claim:

1. In combination, a pair of relatively flat similar gaussmeter probes and a device for retaining said probes comprising two identical probe housing units, each having a plurality of spaced fins extending in parallel planes from a base section, with the fins of each unit extending from their base section a distance substantially equal to one-half the difference between the width and thickness of a probe, with the spacing between adjacent fins substantially equal to the thickness of each of said probes, and removable means retaining said housing units in fixed position with the fins of each unit coplanar with and extending toward the counterpart fins of the other unit, with the probes individually positioned between adjacent fins of each of said units.

2. The invention as recited in claim 1, wherein the said removable means comprises an adhesive tape.

References Cited in the file of this patent

UNITED STATES PATENTS

| | | |
|---|---|---|
| 2,690,368 | Troyke | Sept. 28, 1954 |
| 2,832,013 | Pedersen et al. | Apr. 22, 1958 |